United States Patent [19]

Kendall

[11] Patent Number: 5,280,940
[45] Date of Patent: Jan. 25, 1994

[54] TRAILER HITCH ADAPTER

[75] Inventor: Donald H. Kendall, Lapeer County, Mich.

[73] Assignee: The United States of America as represented by the Secretary of the Army, Washington, D.C.

[21] Appl. No.: 64,320

[22] Filed: May 20, 1993

[51] Int. Cl.⁵ .............................................. B60D 1/00
[52] U.S. Cl. .................................. 280/492; 280/455.1
[58] Field of Search ...................... 280/408, 410, 411.1, 280/455.1, 456.1, 457, 491.1, 491.2, 491.3, 492, 493, 494, 495, 504

[56] References Cited

U.S. PATENT DOCUMENTS

| | | | |
|---|---|---|---|
| 1,423,796 | 7/1922 | Hamann | 280/495 |
| 1,934,141 | 11/1933 | Prentice | 280/492 |
| 2,474,296 | 6/1949 | Wiltsee | 280/492 |
| 2,507,265 | 5/1950 | Patton | 280/494 |
| 2,572,341 | 10/1951 | Hoffman | 280/477 |
| 4,711,461 | 12/1987 | Fromberg | 280/494 |

Primary Examiner—Margaret A. Focarino
Assistant Examiner—Victor E. Johnson
Attorney, Agent, or Firm—Peter A. Taucher; David L. Kuhn

[57] ABSTRACT

Disclosed is an adapter for modifying a hitch connection between two vehicles wherein one vehicle has a hook and another vehicle has a hitch lunette configured to receive the hook. The adapter includes a beam having an adapter lunette on one end swingably engaging the hook and chains to limit the beam's swing about the hook outboard of the one vehicle. At the other end of the beam is a plate to which are fixed flat parallel jaw members, which closely receive the vehicle lunette. The plate bears against the other end of the beam and pivots about a stud on the other end of the beam that extends through the plate. A nut on the stud presses the plate against the other end of the beam with a selected force to achieve controlled resistance to pivoting of the plate.

12 Claims, 2 Drawing Sheets

TRAILER HITCH ADAPTER

GOVERNMENT USE

The invention described herein may be manufactured, used and licensed by or for the U.S. Government for governmental purposes without payment to me of any royalty thereon.

BACKGROUND AND SUMMARY

Many military vehicles such trucks or armored personnel carriers are capable of towing another vehicle, which is commonly a trailer. The towing vehicle, the trailer and their hitch connection must endure the rigors of off-road travel. Occasionally body modifications are made to fielded military vehicles and such modifications may extend the vehicle body toward or over the hitch hardware of these vehicles. In such cases, the distance between the modified vehicle and second, towed vehicle is reduced, and the vehicles are less able to turn without colliding.

My hitch adapter solves the above problem while maintaining the durability of the connection between the vehicles. The adapter has a beam at whose one end is a lunette that swings on a hook of a vehicle. Chains between the beam and the rear of the vehicle limit the beam's outboard swing about the hook. At the other end of the beam is a plate to which are fixed flat parallel jaw members which receive a lunette of another vehicle. The plate bears on the other end of the beam and pivots on a stud there, and a nut on the stud presses the plate to the other end of the beam with selected force to effect controlled resistance to pivoting of the plate. My adapter optionally includes means to limit the pivot of the plate relative to the beam so as to control lateral tilt between the vehicles.

DETAILED DESCRIPTION

Figure 1:
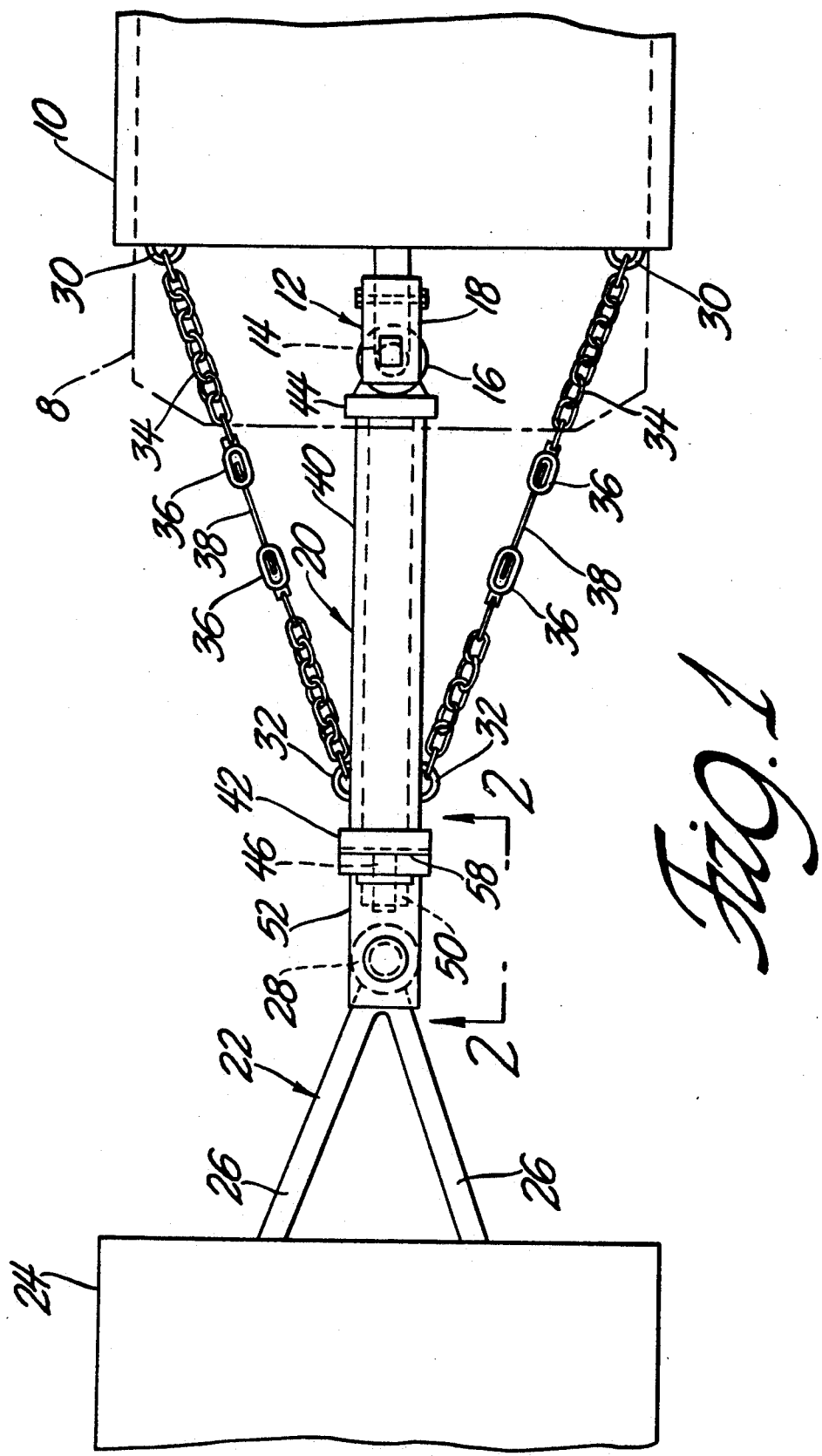
FIG. 1 is a plan view of the rear of one vehicle, the front of another vehicle and a hitch connection therebetween as modified by my adapter.

FIG. 1 shows aft end 10 of a self propelled military vehicle such as the US Army's M113A3 armored personnel carrier. Broken lines outline body element 8 of vehicle 10 at the top thereof, element 8 extending rearward of the vehicle past end 10. The body element can be, for example, a fuel tank or a modular armor component. Attached to aft end 10 is known pintle assembly 12 having a hook element 14 whose bight passes through a ring-like lunette 16. Pintle assembly 12 also has a conventional pivoted keeper 18 that engages hook element 14 so as to lock hook element 14 onto lunette 16, which is an element of adapter 20. Adapter 20 is connected between pintle assembly 12 and tongue 22 affixed at the fore end of trailer 24. Tongue 22 typically has two rigid tongue elements 26 by which trailer lunette 28 is affixed to trailer 24. Connected between eyes 30 on aft end 10 and eyes 32 on assembly 20 are chains 34, whose length and amount of slack are adjustable by rotating turnbuckles 36 on threaded shafts 38. Chains 34 will limit lateral swinging of adapter 20 about hook element 14.

Figure 3:
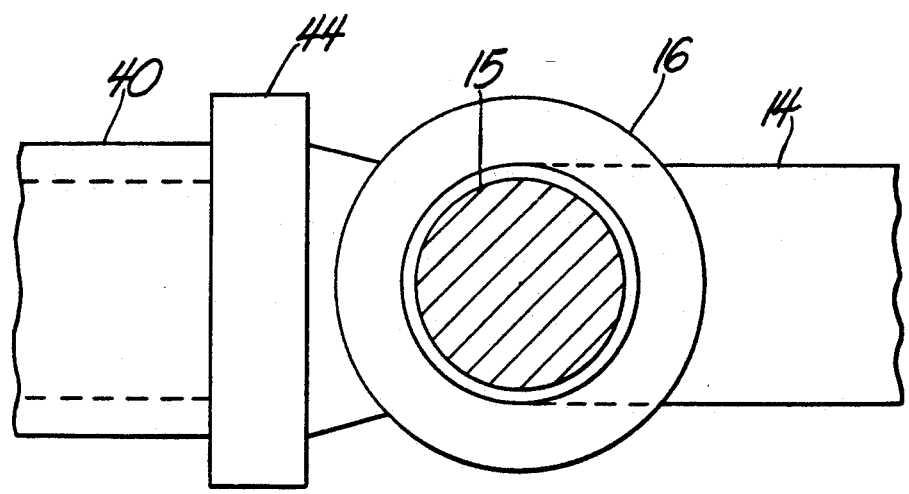
FIG. 3 is a detail view of a hook member on the one vehicle engaging a lunette of the adapter.

It is noted that if lunette 28 were engage to hook element 14 as done conventionally in the past, tongue 22 would be able to swing up or down about the hook element. In view of this, lunette 16 is preferably identical to lunette 28 so that the connection between lunette 16 and hook element 14 allows adapter 20 to swing up and down about element 14 in the same way as would tongue 22. In FIG. 3 is a detail view of lunette 16 with a portion 15 of hook element 14 protruding therethrough.

Adapter 20 is comprised of a beam 40, which typically is a cross sectionally square or circular tube, although beam 40 may be a solid member. At the ends of beam 40 are respective plates 42 and 44, plate 44 having lunette 16 welded or otherwise affixed thereto. From plate 42 protrudes a stud 46 which closely fits through a wall 48, the portion of the stud within wall 48 being round and smooth, and the portion of the stud within nut 50 being threaded therewith.

Figure 2:
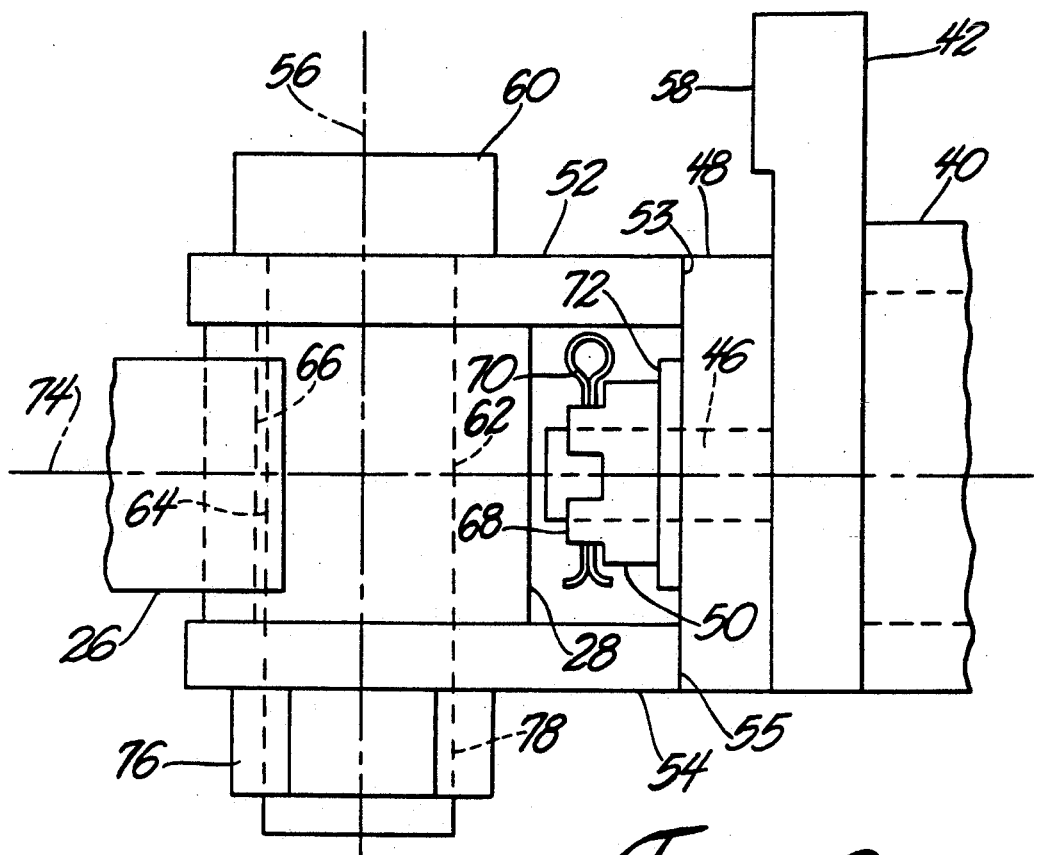
FIG. 2 is a view taken along line 2—2 in FIG. 1.

As perhaps seen better in FIG. 2, wall 48 defines an elongate boss 58 that overhangs wall 48. There extends from wall 48 a parallel pair of flat jaw members 52 and 54 between which is closely received lunette 28 such that the flat top and flat bottom of lunette 28 contact flat interior surfaces of respective jaw members 52 and 54. A pin 60 centered on axis 56 f its closely through plates 52 and 54 and may closely fit through lunette 28 as at interface 62 along the pin. Alternatively, pin 52 may be loosely fit through lunette 26 as shown on the left side 64 of the pin's shank in FIG. 2, where the shank faces inner diametrical portion 66 of lunette 28. In any event, it is desired that lunette 28 be able to rotate about axis 56. Pin 60 is held in place by nut 76 threadingly engaging shank zone 78 of the pin.

Referring again to FIG. 2, nut 50 is a castle nut having merlons 68 between which passes cotter pin 70, the cotter pin also passing through stud 46 so as to lock nut 50 in its position on the stud. Additionally or alternatively, lock washer 72 may be placed between nut 50 and wall 48. The torque on nut 50 may be specially selected so as to provide measured resistance to relative rotation about axis 74 between plate 42 and the assembly of wall 48, jaw member 52, jaw member 54, lunette 26 and pin 60. Elongate boss 58 will limit the amount of this relative rotation between plate 42 and the assembly.

When pin 60 and lunette 28 are removed from between members 52 and 54, access may be had to nut 50 to adjust its tightness or to remove it and wall 48, whereby a differently sized assembly of plate and jaw members may be installed on plate 42. To ease access to nut 50, it is preferred that jaw member 52 and 54 be open on three sides and be closed only at one end. Thus, jaw members 52 and 54 are closed only at respective jaw ends 53 and 55 by wall 48.

I wish it to be understood that I do not desire to be limited to the exact details of construction shown herein since obvious modifications will occur to those skilled in the relevant arts without departing from the spirit and scope of the following claims.

I claim:

1. An adapter for modifying a conventional hitch connection between two vehicles wherein the conventional connection comprises a pintle assembly element on one vehicle and a vehicle lunette on another vehicle configured to receive the assembly element, the adapter comprising:

an elongate rigid beam having a first end and a second end;

an adapter lunette affixed to the first end of the beam and swingably engaging the assembly element;

first means to limit swinging of the beam about the assembly element in an outboard direction relative to the one vehicle while allowing up and down swinging of the beam relative to the one vehicle;

second means for engaging the vehicle lunette at the second end of the beam, the second means including a pair of flat parallel opposed surfaces defining therebetween a narrow gap sized to closely receive the vehicle lunette;

third means for connecting the second means to the beam and for providing positive, controlled resistance to relative rotation between the beam and the second means, the third means allowing the rotation only about a longitudinal axis extending from between the opposed surfaces toward the first end;

wherein the third means comprises a first plate fixed to the opposed surfaces; a second plate fixed on the second end of the beam in face-to-face contact with the first plate; a stud fixed to one of the first and second plates, the stud passing through another of the first and second plates and extending from the other of the plates, the stud having one axial portion whose exterior is round, smooth and closely fits in the other of the plates such that the other of the plates is rotatable about the stud, the stud having another axial portion exterior to the other of the plates;

an attachment member on the other axial portion bearing against the other of the plates so that the other of the plates is pressed with controlled force against the one plate.

2. The adapter of claim 1 wherein:

the attachment member is between the opposed surfaces;

the attachment member is spaced from the vehicle lunette and the opposed surfaces.

3. The adapter of claim 2 wherein the second means includes a pin passing through and fitting closely with the vehicle lunette, wherein the angular mobility of the vehicle lunette on the pin is greater than the angular mobility of the beam about the assembly element member.

4. The adapter of claim 3 wherein the first means comprises;

a first chain attached directly to a first fixed attachment point on the beam and connected to a first position on the one vehicle, the first position removed in one outboard direction from the longitudinal axis;

means in the first chain for adjusting length of the first chain;

a second chain attached directly to a second fixed attachment point on the beam and connected to a second position on the one vehicle, the second position removed in another outboard direction from the longitudinal axis;

means in the second chain for adjusting the length of the second chain.

5. The adapter of claim 2 wherein the third means includes lock means spaced from the opposed surfaces for locking the attachment member in a selected position on the stud.

6. An adapter for modifying a conventional hitch connection between two vehicles wherein the conventional connection comprises a pintle assembly element on one vehicle and a vehicle lunette on another vehicle configured to receive the pintle assembly element, the adapter comprising:

a beam having a first end and a second end, the first end swingably connected to the assembly element;

first means to limit swinging of the beam about the assembly element in an outboard direction relative to the one vehicle;

second means for engaging the vehicle lunette at the second end of the beam;

third means for connecting the second means to the beam and allowing controlledly retarded relative rotation between the beam and the second means, the third means allowing the limited rotation only about a longitudinal axis extending from between the surfaces toward the first end;

wherein the third means comprises a first plate connecting the opposed surfaces; a second plate on the second end of the beam in face-to-face contact with the first plate; a stud fixed to one of the first and second plates, passing through another of the first and second plates and extending from the other of the plates, the stud having one axial portion which is round, smooth and closely fits in the other of the plates, the stud having another axial portion exterior to the other of the plates; an attachment member on the other axial portion pressing against the other of the plates with a selected force against the one plate.

7. The adapter of claim 6 further including:

a stud axis;

a boss fixed to the other plate and rotatable with the other plate about the stud axis;

a portion of the one plate in a rotational path of the boss.

8. A modified hitch connection between two vehicles altering an original hitch connection between the two vehicles wherein the original hitch connection comprises a pintle assembly element on one of the two vehicles and a vehicle lunette on another of the two vehicles, the vehicle lunette in the original hitch connection receiving the assembly element to effect connection between the two vehicles, the modified hitch connection comprising:

the pintle assembly element;

the vehicle lunette;

an adapter connected between and separating the pintle assembly element and the vehicle lunette;

an elongate rigid beam of the adapter having a first end and a second end;

an adapter lunette affixed to the first end of the beam and swingably engaging the assembly element;

first means for engaging the vehicle lunette at the second end of the beam;

second means for connecting the first means to the beam and positively controlledly retarding relative rotation between the beam and the first means, the second means allowing the relative rotation only about a longitudinal axis extending from between the surfaces toward the first end.

9. The adapter of claim 8 further including:

a stud longitudinal axis;

interference means having first and second plates to limit the angle of relative rotation about the stud longitudinal axis between the beam and the first means.

10. The adapter of claim 9 wherein the interference means comprises a portion of one of said plates in a rotational path of the other of said plates plate about the stud longitudinal axis.

11. The adapter of claim 1 further including:
   a stud longitudinal axis;
   interference means at the first and second plates to limit the angle of relative rotation about the stud longitudinal axis between the two plates.

12. The adapter of claim 11 wherein the interference means comprises:
   a portion of the one plate disposed in a rotational path of the other plate about the stud longitudinal axis.

* * * * *